US012760580B2

(12) United States Patent
Shiroma et al.

(10) Patent No.: US 12,760,580 B2
(45) Date of Patent: Oct. 13, 2026

(54) DOOR CLOSING APPARATUS

(71) Applicant: FUJI ELECTRIC CO., LTD., Kawasaki (JP)

(72) Inventors: Takahiro Shiroma, Suzuka (JP); Atsushi Kitabata, Suzuka (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 18/475,748

(22) Filed: Sep. 27, 2023

(65) Prior Publication Data

US 2024/0151091 A1 May 9, 2024

(30) Foreign Application Priority Data

Nov. 9, 2022 (JP) ................................ 2022-179802

(51) Int. Cl.

| | |
|---|---|
| ***E05F 15/635*** | (2015.01) |
| ***B61D 19/00*** | (2006.01) |
| ***E05B 65/08*** | (2006.01) |
| ***E05F 15/662*** | (2015.01) |

(52) U.S. Cl.

CPC .......... *E05F 15/635* (2015.01); *B61D 19/005* (2013.01); *E05B 65/0888* (2013.01); *E05F 15/662* (2015.01)

(58) Field of Classification Search

CPC ..... E05F 15/635; E05F 15/655; E05F 15/662; B61D 19/005

See application file for complete search history.

(56) References Cited

U.S. PATENT DOCUMENTS

| | | | | |
|---|---|---|---|---|
| 2,871,009 | A * | 1/1959 | Picatti | E05F 15/41 49/360 |
| 5,341,598 | A * | 8/1994 | Reddy | E05F 15/40 49/362 |
| 2003/0056685 | A1* | 3/2003 | Covert | E05F 15/635 105/398 |
| 2003/0106457 | A1 | 6/2003 | Inage | |
| 2005/0102903 | A1 | 5/2005 | Takahashi | |
| 2016/0046176 | A1* | 2/2016 | Prevost | E05F 15/646 49/506 |
| 2019/0242175 | A1* | 8/2019 | Fujita | B61D 19/00 |
| 2019/0249472 | A1* | 8/2019 | Provencher | E05B 83/363 |
| 2019/0360255 | A1 | 11/2019 | Ozaki et al. | |

(Continued)

FOREIGN PATENT DOCUMENTS

| | | |
|---|---|---|
| JP | H07-228248 A | 8/1995 |
| JP | 2003237569 A | 8/2003 |
| JP | 2005-145240 A | 6/2005 |

(Continued)

OTHER PUBLICATIONS

Japan Patent Office, Notice of Reasons for Refusal for Japanese Patent Application No. 2022-179802 mailed on Jun. 30, 2026; 7 pp.

*Primary Examiner* — Gregory J Strimbu
(74) *Attorney, Agent, or Firm* — HAUPTMAN HAM, LLP

(57) ABSTRACT

A door closing apparatus includes a first rotary electric motor that is configured to rotate a first pinion to open and close a first door body; and a second rotary electric motor that is provided separately from the first rotary electric motor and configured to rotate a second pinion to open and close a second door body.

12 Claims, 11 Drawing Sheets

(56) References Cited

U.S. PATENT DOCUMENTS

| | | | | |
|---|---|---|---|---|
| 2022/0341227 | A1* | 10/2022 | Ernst | E05B 81/70 |
| 2022/0381079 | A1* | 12/2022 | Vautier | B61B 1/02 |

FOREIGN PATENT DOCUMENTS

| | | | |
|---|---|---|---|
| JP | 2019206329 | A | 12/2019 |
| JP | 2021-142880 | A | 9/2021 |
| KR | 10-0805364 | * | 2/2008 |

* cited by examiner

FIRST MODIFIED EXAMPLE

SECOND MODIFIED EXAMPLE

THIRD MODIFIED EXAMPLE

FIFTH MODIFIED EXAMPLE

SIXTH MODIFIED EXAMPLE

DOOR CLOSING APPARATUS

CROSS-REFERENCE TO RELATED APPLICATION

The priority application claims a priority of Japanese Patent Application No. JP2022-179802 filed on Nov. 9, 2022, the disclosure of which is hereby incorporated by reference.

BACKGROUND OF THE INVENTION

Field of the Invention

The present invention relates to a door closing apparatus.

Description of the Background Art

Conventionally, a door closing apparatus is known. Such an apparatus is disclosed in Japanese Unexamined Patent Publication No. JP H07-228248, for example.

The above Japanese Unexamined Patent Publication No. JP H07-228248 discloses a railroad car door opening/closing apparatus (door closing apparatus). The railroad car door opening/closing apparatus opens/closes a door by means of a linear motor. The linear motor includes a stator coil and a moving part. The moving part of the linear motor is coupled to a door through a drive arm and a joint. In the railroad car door opening/closing apparatus disclosed in the above Japanese Unexamined Patent Publication No. JP H07-228248, the moving part is moved with respect to the stator coils by controlling an electric current applied to the stator coils and the moving part so that the door can open and close.

However, in a case in which one door body (door) is moved by means of the linear motor similar to the railroad car door opening/closing apparatus disclosed in the above Japanese Unexamined Patent Publication No. JP H07-228248, the stator coil is necessarily arranged over a travel distance of the door body. Although not stated in the above Japanese Unexamined Patent Publication No. JP H07-228248, in a case in which a permanent magnet is used for the moving part, the permanent magnet is also necessarily arranged over the travel distance of the door body. As a result, the linear motor will be heavy, and the door closing apparatus will correspondingly be heavy. For this reason, in a case in which two door bodies are independently opened/closed, it is desired to prevent their weight increase.

SUMMARY OF THE INVENTION

The present invention is intended to solve the above problems, and one object of the present invention is to provide a door closing apparatus capable of independently opening/closing two door bodies while preventing their weight increase.

In order to attain the aforementioned object, a door closing apparatus according to an aspect of the present invention includes first and second door bodies that are configured to slide in an opening/closing direction in which one of the first and second door bodies moves away from or toward another of the first and second door bodies to be opened or closed; a first rack that is coupled to the first door body and extends in a closing direction of the first door body; a second rack that is coupled to the second door body and extends in a closing direction of the second door body; a first pinion that rotatably meshes with the first rack; a second pinion that rotatably meshes with the second rack; a first rotary electric motor that is configured to rotate the first pinion to open and close the first door body; and a second rotary electric motor that is provided separately from the first rotary electric motor and configured to rotate the second pinion to open and close the second door body.

In the door closing apparatus according to this aspect of the present invention, as discussed above, a first rotary electric motor that is configured to rotate the first pinion to open and close the first door body, which is coupled to the first rack, and a second rotary electric motor that is provided separately from the first rotary electric motor and configured to rotate the second pinion to open and close the second door body, which is coupled to the second rack, are provided. According to this configuration, because the number of permanent magnets used in a rotary electric motor is smaller than a linear motor, as compared with a case in which linear motors are used to open and close the first door body and the second door body, the entire weight of the apparatus can be reduced by using the first rotary electric motor and the second rotary electric motor. For this reason, in a case in which two door bodies are independently opened/closed, it is desired to prevent their weight increase.

In the door closing apparatus according to the aforementioned aspect, it is preferable that the first rack is arranged to partially overlap the second rack in the opening/closing direction. According to this configuration, the first rack and the second rack can have a length reduced by an amount corresponding to the overlap between the first rack and the second rack in the opening/closing direction.

In the door closing apparatus according to the aforementioned aspect, it is preferable that the first rack is arranged on upper sides of the first door body and the second door body, and extends in the opening/closing direction of the first door body or the second door body from the first door body toward the second door body; and the second rack is arranged on the upper sides of the first door body and the second door body, and extends in the opening/closing direction from the second door body toward the first door body. According to this configuration, because the first rack and the second rack are arranged on the upper sides of the first door body and the second door body, space of a transom part, which corresponds to the upper sides of the first door body and the second door body, can be effectively used. Also, because the first rack extends in the opening/closing direction from the first door body toward the second door body, and the second rack extends in the opening/closing direction from the second door body toward the first door body, the first rack and the second rack can have a length effectively reduced in the opening/closing direction in the space of a transom part, which corresponds to the upper sides of the first door body and the second door body.

In the door closing apparatus according to the aforementioned aspect, it is preferable that the first rotary electric motor is arranged above the first door body on a closing direction side with respect to a center of the first door body in the opening/closing direction; and the second rotary electric motor is arranged above the second door body on a closing direction side with respect to a center of the second door body in the opening/closing direction. According to this configuration, because the overlap between the first rack and the second rack can be increased as compared with a case in which the first rotary electric motor is arranged on an opening direction side with respect to a center of the first door body in the opening/closing direction, and the second rotary electric motor is arranged above the second door body on an opening direction side with respect to a center of the second door body in the opening/closing direction, the length of the first rack and the second rack in the opening/closing direction can be reduced. Consequently, the length in the opening/closing direction can be further reduced.

In the door closing apparatus according to the aforementioned aspect, it is preferable that the first rack and the second rack face each other and extend in the opening/closing direction; and the first pinion and the second pinion are interposed between the first rack and the second rack, and offset from each other in an upward/downward or a forward/backward direction orthogonal to the opening/closing direction and the upward/downward direction. According to this configuration, because the first pinion and the second pinion are offset from each other in the upward/downward or the forward/backward direction, the first pinion, which rotatably meshes with the first rack, can be prevented from interfering with the second rack, and the second pinion, which rotatably meshes with the second rack, can be prevented from interfering with the first rack. Accordingly, in a case in which the first pinion and the second pinion are interposed between the first rack and the second rack and aligned in the opening/closing direction, two different door bodies can be opened and closed independently from each other. As a result, an increase of the length of the first rack and the second rack in a direction in which the first rack and the second rack face each other can be prevented by aligning the first pinion and the second pinion in the opening/closing direction between the first rack and the second rack.

In the door closing apparatus according to the aforementioned aspect, it is preferable that a first controller that is configured to control a function of driving the first rotary electric motor; and a second controller that is provided separately from the first controller and configured to control a function of driving the second rotary electric motor are further provided. According to this configuration, in case in which a failure occurs in one of the separated first and the second controllers, another controller can control its corresponding rotary electric motor so that the first door body or the second door body corresponding to another side can be opened and closed. Accordingly, dissimilar to a case in which a common controller controls functions of driving the first rotary electric motor and of driving the second rotary electric motor, in case in which a failure occurs in one of the controllers, it is possible to prevent disabling of functions of opening/closing both the first and second door bodies.

In this configuration, it is preferable that a first door body detector that is configured to detect a position of the first rack so as to detect an opened/closed state of the first door body and to provide a signal indicating the opened/closed state of the first door body to the first controller; and a second door body detector that is provided separately from the first door body detector and configured to detect a position of the second rack so as to detect an opened/closed state of the second door body and to provide a signal indicating the opened/closed state of the second door body to the second controller, are further provided. According to this configuration, it can be determined whether the function of opening/closing the first door body is properly controlled by the first controller based on the signal from the first door body detector, and it can be determined whether the function of opening/closing the second door body is properly controlled by the second controller based on the signal from the second door body detector. Accordingly, because it can be separately determined whether the first controller and the second controller properly control their functions, in case in which a failure occurs in any one of the first controller and the second controller, the function of opening/closing the first door body or the second door body can be controlled by another controller in which the failure does not occur.

In the door closing apparatus according to the aforementioned aspect, it is preferable that a first lock that is configured to limit movement of the first rack so as to limit movement of the first door body in the opening direction of the first door body; and a second lock that is provided separately from the first lock and configured to limit movement of the second rack so as to limit movement of the second door body in the opening direction of the second door body, are further provided. According to this configuration, movement of the first door body and movement of the second door body can be independently limited by independently limiting movement of the first rack and movement of the second rack. Accordingly, in case in which a failure occurs in any one of the first rotary electric motor, which moves the first door body, and the second rotary electric motor, which moves the second door body, while movement of one of the first and second door bodies corresponding the one of the first and second rotary electric motors in which the failure occurs can be limited by the first lock or the second lock, movement of another door body corresponding another rotary electric motors in which the failure does not occur can be allowed so that another door body corresponding another rotary electric motors in which the failure does not occur can be opened/closed.

In this configuration, it is preferable that a first lock detector that is configured to detect limitation of movement of the first rack limited by the first lock; and a second lock detector that is configured to detect limitation of movement of the second rack limited by the second lock are further provided. According to this configuration, it can be separately determined whether the limitation of movement is properly limited by the first lock and whether the limitation of movement is properly limited by the second lock. Accordingly, it is possible to prevent from maintaining an improper state in which movement of the first door body and movement of the second door body are not properly limited.

In the door closing apparatus according to the aforementioned aspect, it is preferable that the first rack is coupled to the first door body installed on a rail car, and extends in the closing direction of the first door body; and the second rack is coupled to the second door body installed on the rail car, and extends in the closing direction of the second door body. Because rail cars have limits of load weight and capacity area, according to this configuration, in a case in which the first door body and the second door body, which are installed on the rail car, are independently opened and closed, increase of the weight can be prevent and the length in the opening/closing direction can be effectively reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Embodiments embodying the present invention are hereinafter described on a basis of drawings.

A door closing apparatus 100 according to one embodiment of the present invention is now described with reference to FIGS. 1 to 9A and 9B.

(Configuration of Door Closing Apparatus)

Figure 1:
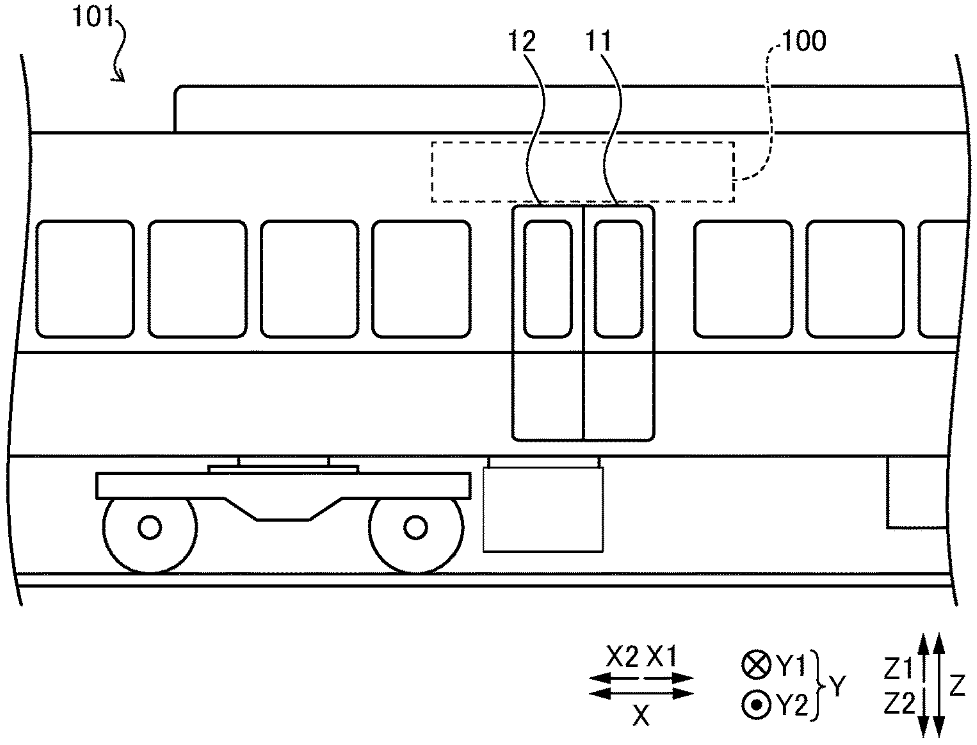
FIG. 1 is a schematic diagram showing a rail car with a door closing apparatus according to one embodiment.

As shown in FIG. 1, the door closing apparatus 100 is installed on a rail car 101. The door closing apparatus 100 is a motor-driven apparatus that opens and closes the door bodies 11 and 12 mounted to the rail car 101. The door body 11 and the door body 12 are sliding doors configured to slide in an opening/closing direction (X direction) in which one of the door bodies moves away from or toward another of the door bodies to be opened and closed. The door closing apparatus 100 is arranged in a transom part, which corresponds to the upper sides of the door bodies 11 and 12 in the rail car 101. The door body 11 and the door body 12 are examples of a "first door body" and a "second door body", respectively, in the claims.

In the following description, the opening/closing direction of the door body 11 and the door body 12 is defined as an X direction, and one X direction toward the door body 11 side is defined as an X1 direction while another X direction toward the door body 12 side is defined as an X2 direction. That is, the opening direction of the door body 11 is defined by the X1 direction, and the closing direction of the door body 11 defined by the X2 direction. Also, the opening direction of the door body 12 is defined by the X2 direction, and the closing direction of the door body 12 defined by the X1 direction. In addition, an upward/downward direction (vertical direction) is defined as a Z direction, and the upward vertical direction, which is one Z direction, is defined as a Z1 direction while the downward vertical direction, which is another Z direction, is defined as a Z2 direction. In addition, a forward/backward direction orthogonal to the opening/closing direction (X direction) and the upward/downward direction (Z direction) is defined as a Y direction, and one Y direction, which is an inward direction of the car, is defined as a Y1 direction while another Y direction, is an outward direction of the car, is defined as a Y2 direction. Also, a state in which the door body 11 and the door body 12 are closed by moving them in their closing directions refers to a closed state (see FIG. 5), and a state in which the door body 11 and the door body 12 are opened by moving them in their opening directions refers to an opened state (see FIG. 6).

Figure 2:
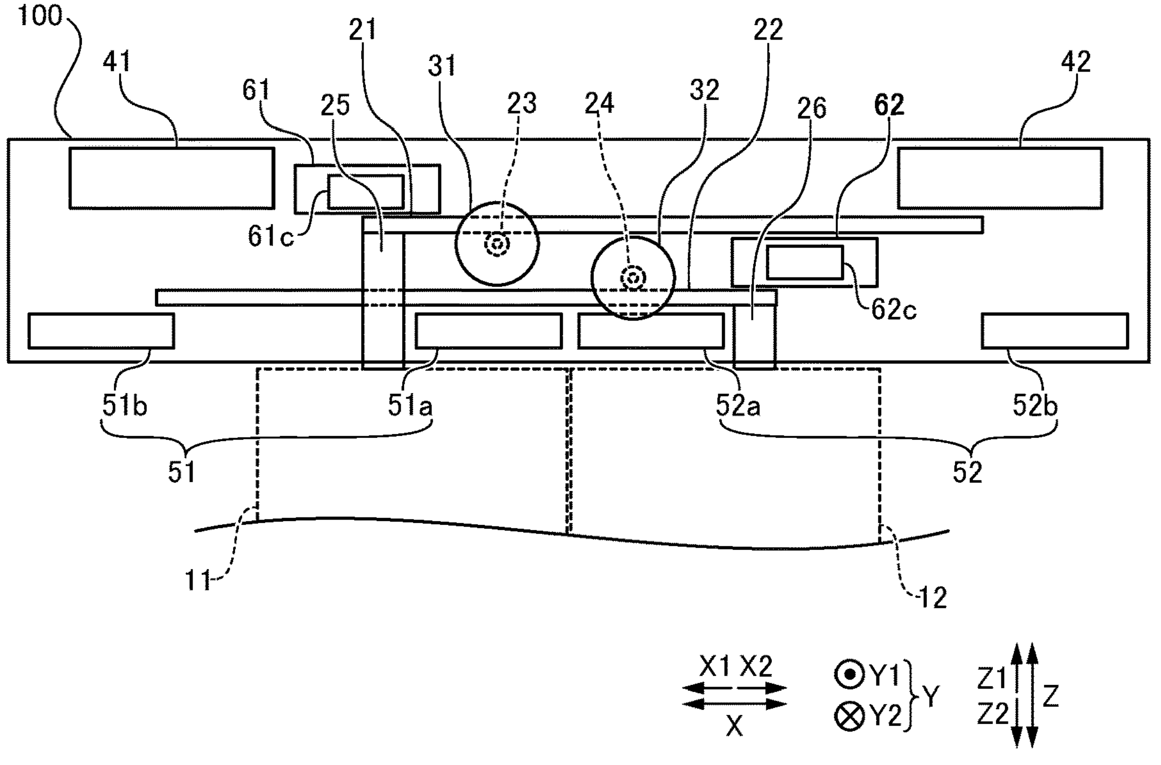
FIG. 2 is a schematic diagram showing a configuration of the door closing apparatus.

As shown in FIG. 2, the door closing apparatus 100 includes a rack 21, a rack 22, a pinion 23, a pinion 24, a connector 25, a connector 26, an electric motor 31, an electric motor 32, a controller 41 and a controller 42. The rack 21, the rack 22, the pinion 23, the pinion 24, the connector 25, the connector 26, the electric motor 31, the electric motor 32, the controller 41 and the controller 42 are accommodated in an elongated box-shaped housing extending in the X direction in the door closing apparatus 100. FIG. 2 shows a diagram of the door closing apparatus 100 from the interior side of the car. The rack 21 and the rack 22 are examples of a "first rack" and a "second rack", respectively, in the claims. The pinion 23 and the pinion 24 are examples of a "first pinion" and a "second pinion", respectively, in the claims. The electric motor 31 and the electric motor 32 are examples of a "first rotary electric motor" and a "second rotary electric motor", respectively, in the claims. The controller 41 and the controller 42 are examples of a "first controller" and a "second controller", respectively, in the claims.

The rack 21 extends in the X2 direction, which is the closing direction of the door body 11. The rack 22 extends in the X1 direction, which is the closing direction of the door body 12. Specifically, the rack 21 is arranged on the upper sides (Z1-direction side) of the door body 11 and the door body 12, and extends from the door body 11 toward the door body 12 in the X2 direction. The rack 22 is arranged on the upper sides (Z1-direction side) of the door body 11 and the door body 12, and extends from the door body 12 toward the door body 11 in the X1 direction.

The rack 21 and the rack 22 face each other in the Z direction and extend in their corresponding X direction. In other words, the rack 21 is arranged to partially overlap the rack 22 in the opening/closing direction (X direction). Specifically, a part of the rack 21 overlaps the rack 22 as viewed in the upward/downward direction (Z direction). In other words, parts of the rack 21 and the rack 22, which extend in the X direction, overlap each other as viewed in the upward/downward direction (Z direction). The rack 21 is arranged on the Z1-direction side with respect to the rack 22. The rack 21 and the rack 22 are arranged on a common plane extending in the Y direction. That is, the racks 21 and 22 are arranged in an X-Z plane, and extend in the X direction, which is a horizontal direction.

The rack 21 is coupled to the door body 11 through the connector 25. The rack 22 is also coupled to the door body 12 through the connector 26. That is, the rack 21 and the door body 11 move together in the X direction. Also, the rack 22 and the door body 12 move together in the X direction. The connector 25, for example, is a plate-shaped member that hangs the door body 11. The connector 26, for example, is a plate-shaped member that hangs the door body 12. The connector 25 extends in the Z direction and one side of the connector 25 in the Y direction is coupled to the rack 21 and the door body 11. The connector 26 extends in the Z direction and one side of the connector 26 in the Y direction is coupled to the rack 22 and the door body 12.

The pinion 23 and the pinion 24 are pinion gears. Specifically, the pinion 23 is configured to be rotated by a driving function of the electric motor 31 while meshing with the rack 21. The pinion 24 is configured to be rotated by a driving function of the electric motor 32 while meshing with the rack 22. That is, separated rack-and-pinion structures are formed by a set of the rack 21 and the pinion 23, and a set of the rack 22 and the pinion 24.

The electric motor 31 and the electric motor 32 are rotary electric motors. The electric motor 31 and the electric motor 32 are, for example, brushless DC electric motors. The electric motor 31 and the electric motor 32 are configured to produce a driving force that can open and close the door body 11 and the door body 12, respectively. Specifically, the electric motor 31 is configured to rotate the pinion 23 to open and close the door body 11 coupled to the rack 21. The electric motor 32 is configured to rotate the pinion 24 to open and close the door body 12 coupled to the rack 22. The electric motor 31 and the electric motor 32 are provided separately from each other.

Figure 3:
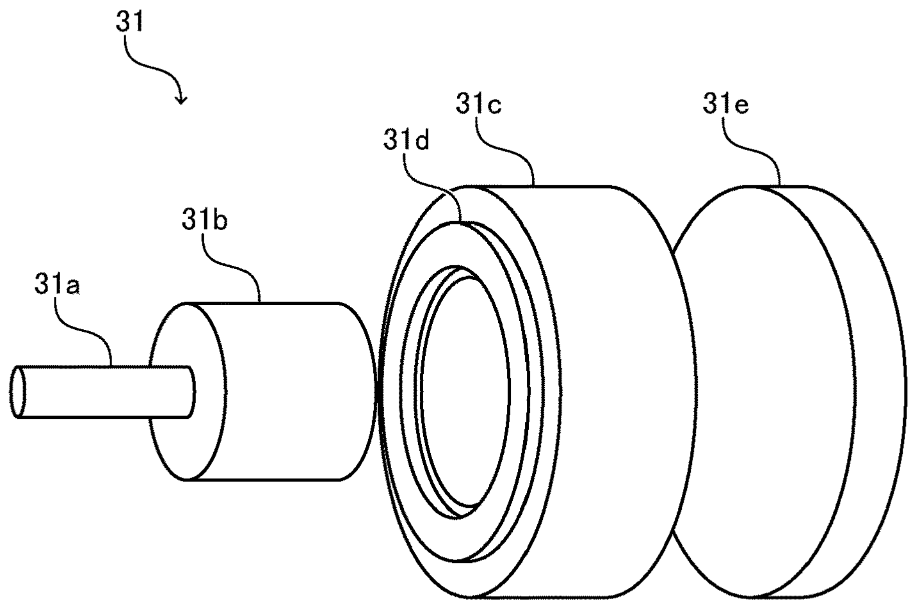
FIG. 3 is an exploded diagram illustrating a configuration of an electric motor.

As shown in FIG. 3, the electric motor 31 includes an output shaft 31*a*, a rotor 31*b*, a stator 31*c*, a coil part 31*d* and an encoder 31*e*. The output shaft 31*a* is coupled to the rotor 31*b*. The rotor 31*b* can rotate relative to the stator 31*c*, and includes permanent magnets fixed to a surface of the rotor 31*b*. The coil part 31*d* is provided to the stator 31*c*. The electric motor 31 is configured to produce a force in the stator 31*c* that rotates the rotor 31*b* when a driving current is applied from the controller 41 to the coil part 31*d*. The output shaft 31*a* which is coupled to the rotor 31*b* can be rotated together with the rotor 31*b* when the rotor 31*b* rotates. The pinion 23 is fixed to the output shaft 31*a*. The electric motor 31 is configured to rotate the output shaft 31*a* about a rotation center axis extending to a direction parallel to the Y direction whereby rotating the pinion 23. The encoder 31*e* is configured to provide a signal indicating a rotation angle of the rotor 31*b* to the controller 41. The electric motor 32 has the same structure as the electric motor 31. The electric motor 32 is configured to rotate the output shaft 32*a* (see FIG. 4) to which the pinion 24 is fixed about a rotation center axis extending to a direction parallel to the Y direction whereby rotating the pinion 24. An encoder (not shown) of the electric motor 32 is configured to provide a signal indicating a rotation angle of the electric motor 32 to the controller 42.

As shown in FIG. 2, the electric motor 31 and the electric motor 32 are aligned in the opening/closing direction (X direction) on the upper sides of the door body 11 and the door body 12. The electric motor 31 is arranged on the door body 11 side (X1-direction side). The electric motor 32 is arranged on the door body 12 side (X2-direction side). Specifically, the electric motor 31 is arranged on the closing direction side (X2-direction side) with respect of a center in the opening/closing direction (X direction) of the door body 11 on the upper side of the door body 11. Parts of the electric motor 31 other than the output shaft 31*a* are arranged on the interior side of the car (Y1-direction side) with respect to the pinion 23. The electric motor 32 is arranged on the closing direction side (X1-direction side) with respect of a center in the opening/closing direction (X direction) of the door body 12 on the upper side of the door body 12. Parts of the electric motor 32 other than the output shaft 32*a* are arranged on the interior side of the car (Y1-direction side) with respect to the pinion 24, similar to the electric motor 31.

Figure 4:
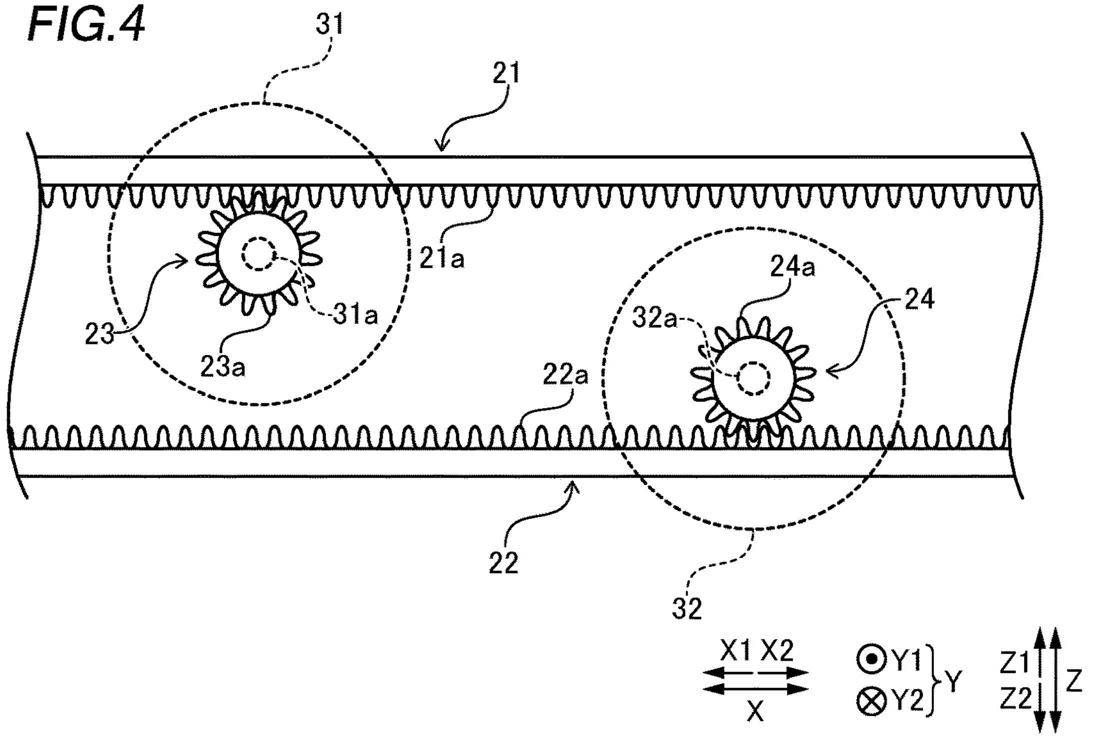
FIG. 4 is a diagram illustrating functions of racks and pinions.

As shown in FIG. 4, the rack 21 and the rack 22 have teeth 21*a* and teeth 22*a*, respectively. The teeth 21*a* are aligned in the X direction on a lower side (Z2-direction side) of the rack 21. The teeth 22*a* are aligned in the X direction on an upper side (Z1-direction side) of the rack 22. The pinion 23 and the pinion 24 have teeth 23*a* and teeth 24*a*, respectively. The pinion 23 is arranged on the lower side (Z2-direction side) of the rack 21 so that the teeth 23*a* mesh with the teeth 21*a* of the rack 21. The pinion 24 is arranged on the upper side (Z1-direction side) of the rack 22 so that the teeth 24*a* mesh with the teeth 22*a* of the rack 22.

The pinion 23 and the pinion 24 are interposed between the rack 21 and the rack 22, and offset from each other in the upward/downward (Z direction). Specifically, the pinion 23 is arranged on the upper side in the upward/downward direction (Z1 direction) with respect to the pinion 24. The pinion 23 and the pinion 24 are aligned at a substantially common position in the Y direction. Accordingly, the pinion 23 meshes with the rack 21 but is spaced away from the rack 22. The pinion 24 meshes with the rack 22 but is spaced away from the rack 21.

Figure 5:
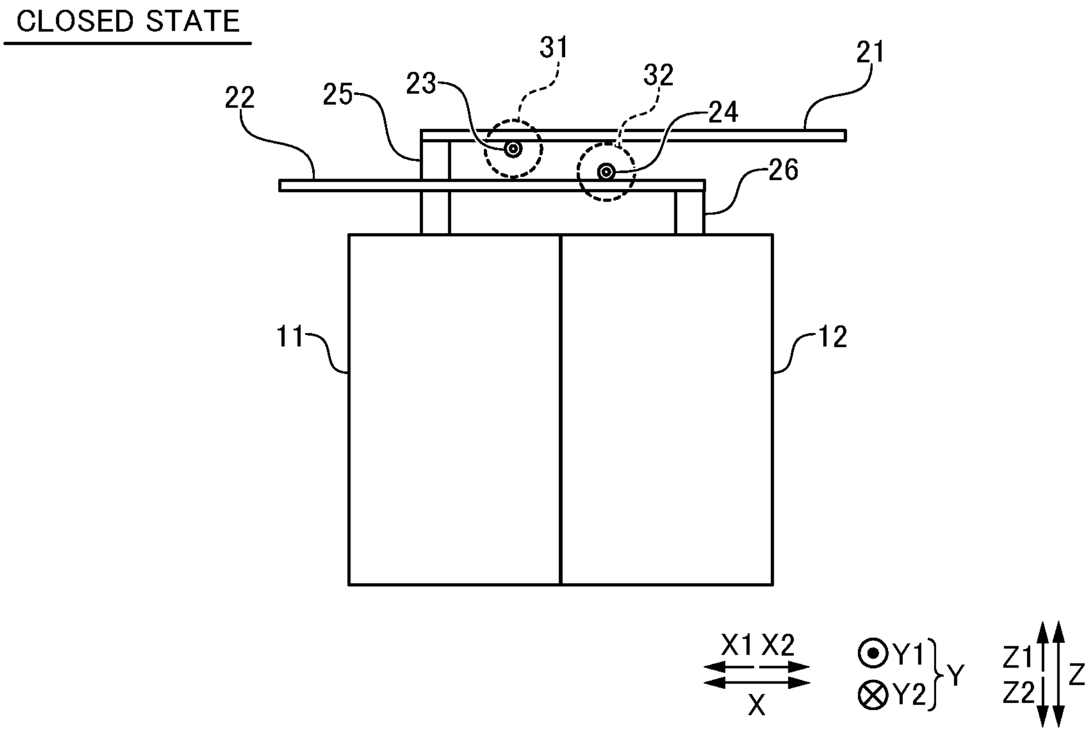
FIG. 5 is a diagram showing a closed state of two door bodies.
Figure 6:
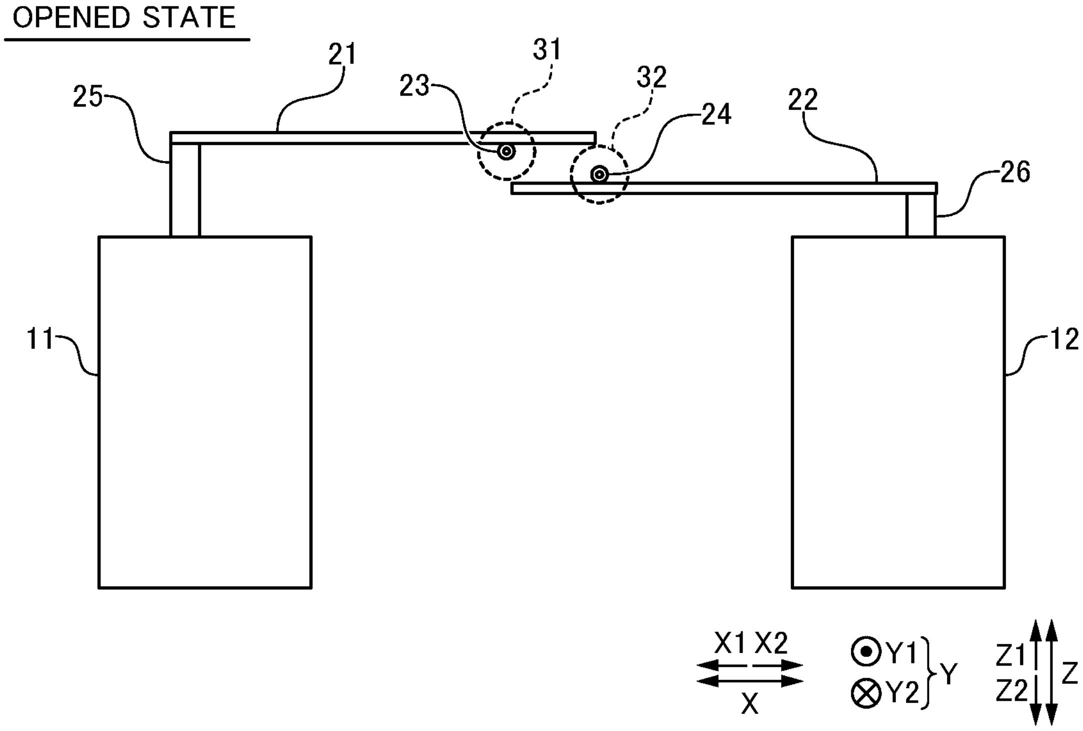
FIG. 6 is a diagram showing an opened state of the two door bodies.

As shown in FIGS. 5 and 6, the rack 21 is configured to be moved in the opening/closing direction (X direction) by the pinion 23 rotated by the electric motor 31. Also, the rack 22 is configured to be moved in the opening/closing direction (X direction) by the pinion 24 rotated by the electric motor 32. The door body 11 is configured to be moved in the opening/closing direction by the movement of the rack 21. Also, the door body 12 is configured to be moved in the opening/closing direction by the movement of the rack 22. For example, when the pinion 23 is rotated clockwise in FIG. 4, the rack 21 is moved along a guide rail (not shown) in the X2 direction as the closing direction. Also, when the pinion 24 is rotated clockwise in FIG. 4, the rack 22 is moved along a guide rail (not shown) in the X1 direction as the closing direction.

In a case in which the first and the second door bodies 11, 12 are in a closed state as shown in FIG. 5, an end of the first rack 21 protrudes in the opening direction X2 of the second door body 12 from an outer edge of the second door body 12 by an amount equal to or less than half a width of the second door body 12 in the opening/closing directions X, and an end of the second rack 22 protrudes in the opening direction X1 of the first door body 11 from an outer edge of the first door body 11 by an amount equal to or less than half a width of the first door body 11 in the opening/closing directions X.

As shown in FIG. 5, the first rack 21 is arranged to partially overlap the second rack 22 as viewed in upward/downward directions Z of the first and the second door bodies 11, 12 which is orthogonal to the opening/closing directions X, and the first rack 21 is arranged to partially overlap the second rack 22 along the opening/closing directions X.

As shown in FIG. 5, the first rotary electric motor 31 is arranged, as viewed from front/rear directions Y which are perpendicular to both the opening/closing directions X of the first door body 11 and the second door body 12, and upward/downward directions Z, between center of an aperture that is closed by the first and second door bodies 11, 12 and a first connection portion 25 that connects the first rack 21 and the first door body 11, and the second rotary electric motor 32 is arranged, as viewed from the front/rear directions Y which are perpendicular to both the opening/closing directions X of the first door body 11 and the second door body 12, and the upward/downward directions Z, between center of the aperture and a second connection portion 26 that connects the second rack 22 and the second door body 12.

As shown in FIG. 2, the controller 41 and the controller 42 are arranged on the upper sides of the rack 21 and the rack 22. The controller 41 controls a function of driving the electric motor 31 by supplying the driving current to the electric motor 31. Also, the controller 42 controls a function of driving the electric motor 32 by supplying the driving current to the electric motor 32. The controller 42 is provided separately from the controller 41. The controller 41 and the controller 42 include micro-controllers, respectively, each of the micro-controllers including a central processing unit (CPU), for example. The controller 41 and controller 42 are configured to communicate with a car control device (not shown). The controller 41 and the controller 42 open and close the door body 11 and the door body 12, respectively, in accordance with the signals provided from the car control device. Control processing of the controller 41 and the controller 42 will be described later.

As shown in FIG. 2, the door closing apparatus 100 includes a door body detector 51 and a door body detector 52. The door body detector 51 and the door body detector 52 are provided separately from each other. The door body detector 51 includes a door closing detection switch 51*a* and a door opening detection switch 51*b*. Also, the door body detector 52 includes a door closing detection switch 52*a* and a door opening detection switch 52*b*. The door body detector 51 and the door body detector 52 are examples of a “first door body detector” and a “second door body detector”, respectively in the claims.

Figure 7:
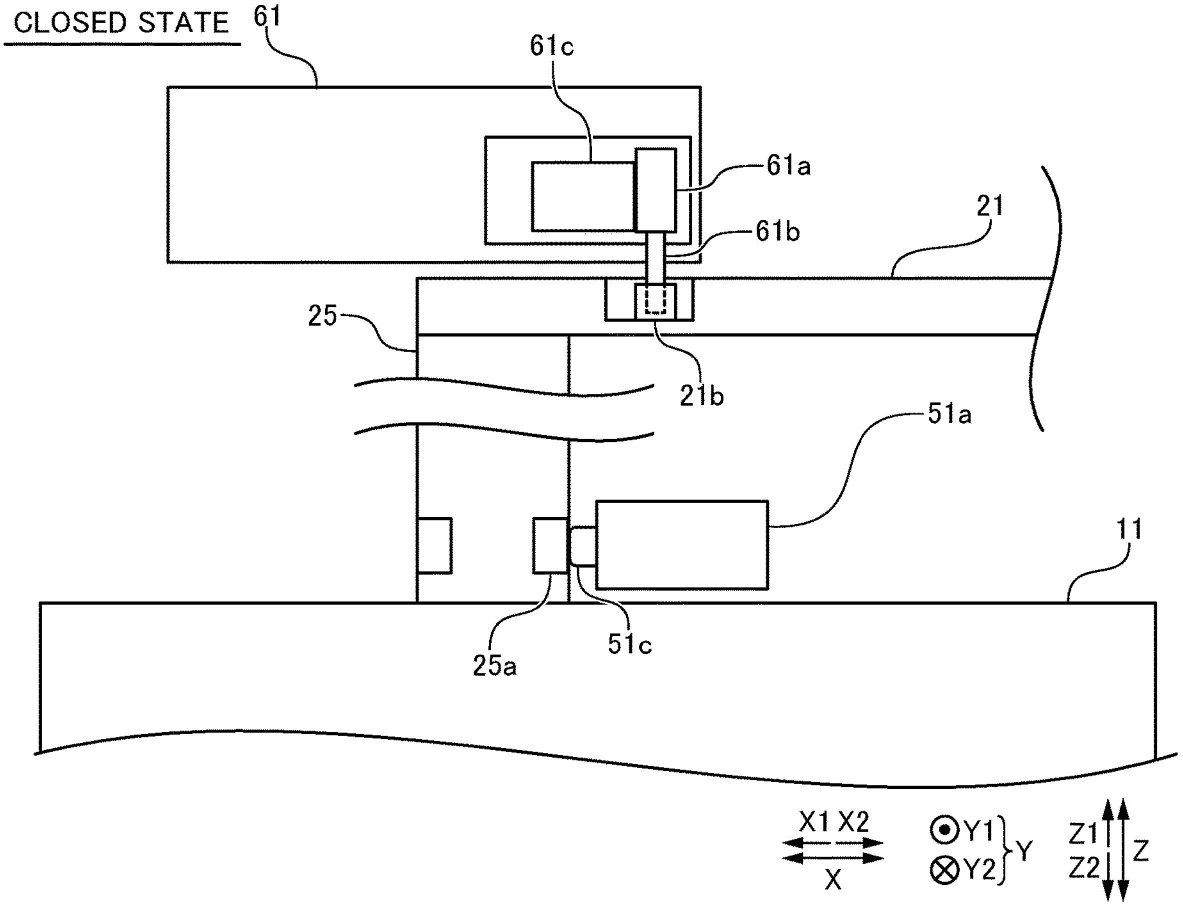
FIG. 7 is a schematic diagram showing a door closing detection switch and a lock.

The door closing detection switch 51*a* is configured to detect that the rack 21 is in a closed position when detecting the connector 25, as shown in FIG. 7. For example, the door closing detection switch 51*a* includes a limit switch. Specifically, the door closing detection switch 51*a* includes a moving part 51*c*. When the door body 11 is in the closed position, the door closing detection switch 51*a* detects a press of the moving part 51*c* in the X2 direction pressed by a press part 25*a* included in the connector 25 whereby detecting that the door body 11 is in the closed position (closed state).

Figure 8:
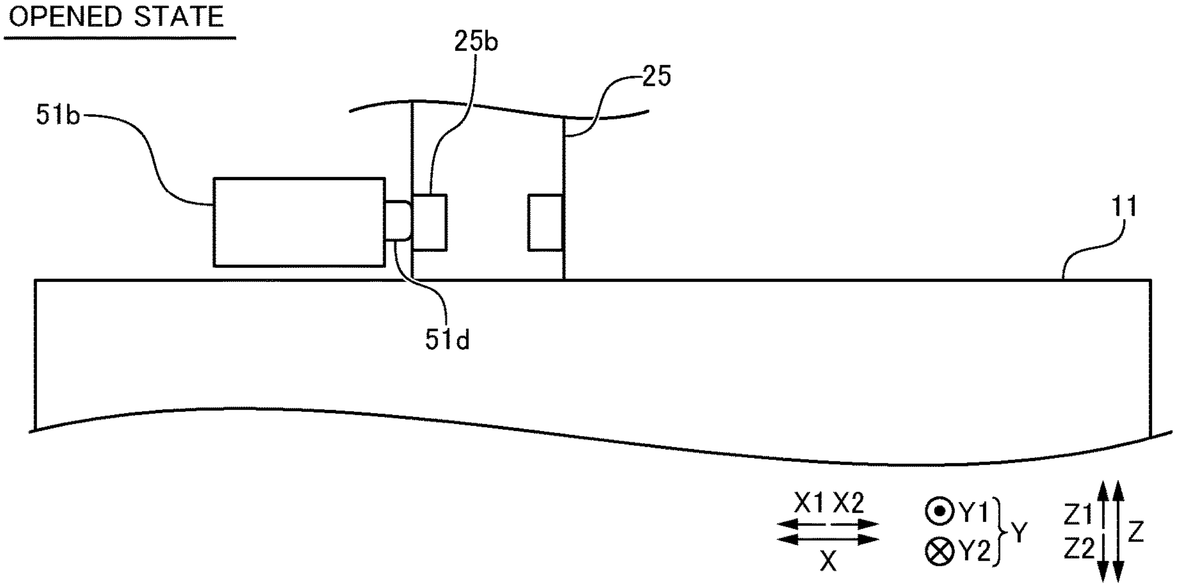
FIG. 8 is a schematic diagram showing a door closing detection switch.

The door opening detection switch 51*b* is configured to detect that the rack 21 is in an opened position when detecting the connector 25, as shown in FIG. 8. For example, the door opening detection switch 51*b* includes a limit switch similar to the door closing detection switch 51*a*. The door opening detection switch 51*b* includes a moving part 51*d*. When the door body 11 is in the opened position, the door opening detection switch 51*b* detects a press of the moving part 51*d* in the X1 direction pressed by a press part 25*b* included in the connector whereby detecting that the door body 11 is in the opened position (closed state).

Accordingly, the door closing detection switch 51*a* and the door opening detection switch 51*b* (door body detectors 51) are configured to detect a position of the rack 21 by detecting the connector 25 to detect the opened and closed states of the door body 11. The door closing detection switch 51*a* and the door opening detection switch 51*b* of the door body detector 51 are electrically connected to the controller 41. The door closing detection switch 51*a* and the door opening detection switch 51*b* are configured to provide the controller 41 with a signal indicating that the rack 21 is detected when detecting the rack 21. In other words, the door closing detection switch 51*a* and the door opening detection switch 51*b* (door body detectors 51) are configured to provide their corresponding signal indicating the opened/closed state of the door body 11 to the controller 41.

The door body detector 52 is configured similar to the door body detector 51. That is, the door closing detection switch 52*a* and the door opening detection switch 52*b* are configured to detect that rack 22 is in the closed position and the opened position, respectively, by detecting the connector 26, similar to the door closing detection switch 51*a* and the door opening detection switch 51*b*. In other words, the door closing detection switch 52*a* and the door opening detection switch 52*b* (door body detectors 52) are configured to detect a position of the rack 22 by detecting the connector 26 to detect the opened and closed states of the door body 12. The door closing detection switch 52*a* and the door opening detection switch 52*b* of the door body detector 52 are configured to provide the controller 42 with a signal indicating that the rack 22 is detected as a signal indicating the opened/closed state of the door body 12 when detecting the rack 22.

In addition, the door closing apparatus 100 includes locks 61 and 62, as shown in FIG. 2. The lock 61 is configured to limit movement of the rack 21 whereby limiting movement of the door body 11 in the closed state in the opening direction (X1 direction). Also, the lock 62 is configured to limit movement of the rack 22 whereby limiting movement of the door body 12 in the closed state in the opening direction (X2 direction). The locks 61 and 62 are provided separately from each other. The lock 61 and the lock 62 are examples of a “first lock” and a “second lock”, respectively, in the claims.

Specifically, the lock 61 includes a solenoid coil 61*a* and a moving part 61*b*, as shown in FIG. 7. The solenoid coil 61*a* is configured to move the moving part 61*b* in the upward/downward direction (Z direction) when energized. The moving part 61*b* is a bar-shaped member extending in the Z direction. The moving part 61*b* is configured to engage an engagement part 21*b* provided in the rack 21 when being moved downward (Z2 direction) by the solenoid coil 61*a*. Accordingly, the moving part 61*b* can limit movement of the rack 21 in the X direction when engaging the engagement part 21*b*. The engagement part 21*b* is fixed to the rack 21 at a position in which the engagement part 21*b* can engage the moving part 61*b* when the door body 11 is in the closed position.

In addition, the lock 61 includes a lock detector 61*c*. The lock detector 61*c* is configured to detect that the lock 61 limits movement of the door body 11 in the opening direction. In other words, the lock detector 61*c* is configured to detect that movement of the door body 11 is limited by detecting that movement of rack 21 is limited by the lock 61. The lock detector 61*c*, for example, includes a limit switch. The switch of the lock detector 61*c* is configured to be pressed by the moving part 61*b* moved by the solenoid coil 61*a*. That is, the lock detector 61*c* can detect that the moving part 61*b* engages the engagement part 21*b* based on movement of the moving part 61*b* moved by the solenoid coil 61*a*. The lock detector 61*c* is configured to provide the controller 41 with a signal indicating that movement of the door body 11 is limited. The lock detector 61*c* is an example of a "first lock detector" in the claims.

The lock 62 has a structure similar to the lock 61. The lock 62 includes a lock detector 62*c* (see FIG. 2) similar to the lock 61. The lock detector 62*c* is configured to detect that movement of the door body 12 in the opening direction is limited by detecting that movement of rack 22 is limited by the lock 62, similar to the lock detector 61*c*. The lock detector 62*c* is configured to provide the controller 42 with a signal indicating that movement of the door body 12 is limited. The lock detector 62*c* is an example of a "second lock detector" in the claims.

(Opening and Closing Control by Controller)

The controller 41 is configured to open and close the door body 11 in accordance with the signal provided from the car control device (not shown). Specifically, in a case in which the door body 11 is in the closed state, the controller 41 can control movement of the door body 11 from the closed state to the opened state when receiving an opening instruction signal, from the car control device, indicating that the door body 11 is brought into opened state. In this case, the controller 41 first provides the lock 61 with a signal indicating that the limitation of movement of the door body 11 is released. Then, the controller 41 will receive a signal, from the lock detector 61*c*, indicating that the limitation of movement of the door body 11 has been released. If the controller 41 does not receive the signal indicating that the limitation of movement of the door body 11 has been released, the controller 41 provides an error signal to the car control device.

Subsequently, the controller 41 provides the electric motor 31 with a driving signal to move the door body 11 to be in the opened state. Specifically, the controller 41 supplies a driving current to the coil part 31*d* of the electric motor 31 so as to rotate the electric motor 31 by a predetermined rotation angle corresponding to a predetermined travel distance of movement of the door body 11. The controller 41 controls a rotation angle of the electric motor 31 based on feedback control in accordance with a signal from the encoder 31*e* whereby moving the door body 11 to a position corresponding to the opened position. After moving the door body 11 to the position corresponding to the opened position, the controller 41 will receive a signal, from the door opening detection switch 51*b*, indicating that the door body 11 is in the opened position. If the controller 41 does not receive the signal indicating that the door body 11 is in the opened position, the controller 41 provides an error signal to the car control device.

Also, in a case in which the door body 11 is in the opened state, the controller 41 can control movement of the door body 11 from the opened state to the closed state when receiving a closing instruction signal, from the car control device, indicating that the door body 11 is brought into closed state. Specifically, the controller 41 controls the door body 11 to be moved to a position corresponding to the closed position, similar to the case in which the door body 11 is moved to the opened state. After moving the door body 11 to the position corresponding to the closed position, the controller 41 will receive a signal, from the door closing detection switch 51*a*, indicating that the door body 11 is in the closed position, similar to the case in which the door body 11 is moved to the opened state. If the controller 41 does not receive the signal indicating that the door body 11 is in the closed position, the controller 41 provides an error signal to the car control device.

In the closed state, the controller 41 controls the limitation of movement of the door body 11. Specifically, when receiving the signal, from the door closing detection switch 51*a*, indicating that the door body 11 is in the closed position, the controller 41 provides the lock 61 with a signal to limit movement of the door body 11. The lock 61 is configured to limit movement of the door body 11 in accordance with the signal from the controller 41. Then, the controller 41 will receive a signal, from the lock detector 61*c*, indicating that movement of the door body 11 is limited. If the controller 41 does not receive the signal indicating that movement of the door body 11 is limited, the controller 41 provides an error signal to the car control device.

Control of movement of the door body 12 by the controller 42 is the same as the control by the controller 41, therefore, its description is omitted. That is, the controller 42 is configured to control a function of driving the electric motor 32, independently from the controller 41, in accordance with signals from the car control device, a signal from the door body detectors 52 (door closing detection switch 52*a* and door opening detection switch 52*b*), and a signal from the lock detector 62*c* whereby opening and closing the door body 12. As a result, the controller 41 can control the electric motor 31 based on the feedback, and the controller 42 can control the electric motor 32 based on the feedback.

Comparison with Comparative Example

Figure 9A:
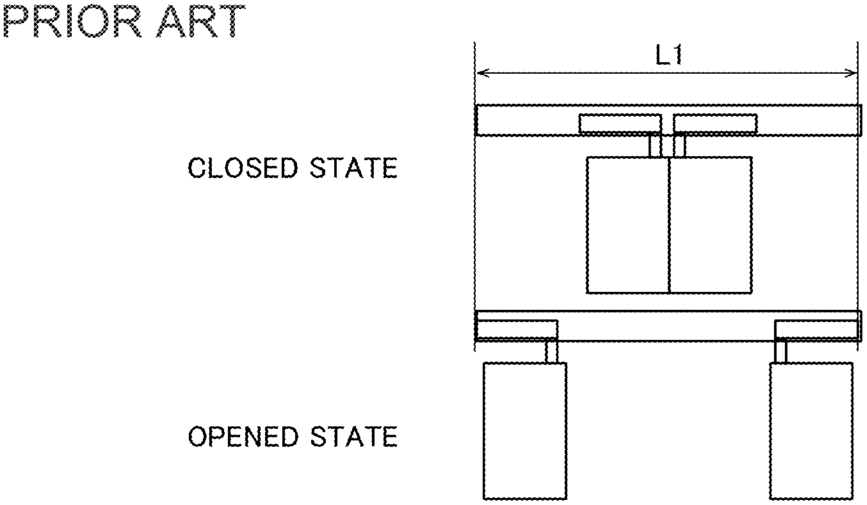
FIG.9A PRIOR ART
FIG. 9A is a diagram showing a door closing apparatus of a comparative example for illustrating comparison between the door closing apparatus of the comparative example and the door closing apparatus according to the one embodiment.
Figure 9B:
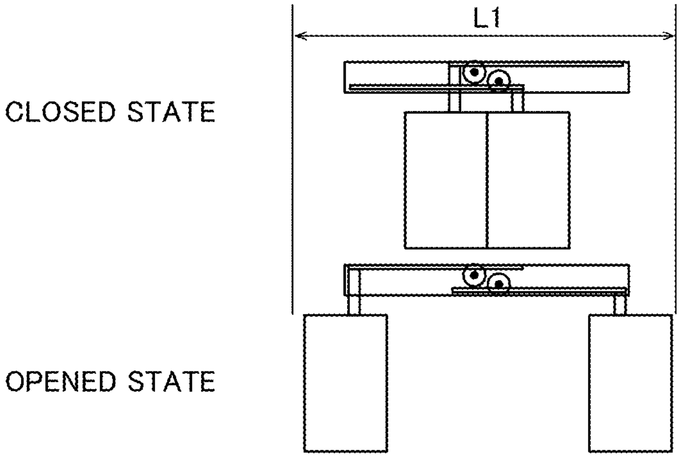
FIG. 9B is a diagram showing the door closing apparatus according to the one embodiment for illustrating comparison between the door closing apparatus of the comparative example and the door closing apparatus according to the one embodiment.

The following description describes a comparison between a door closing apparatus of a comparative example and the door closing apparatus 100 according to one embodiment of the present invention with reference to FIGS. 9A and 9B.

As shown in FIG. 9A, in the door closing apparatus of the comparative example, one linear electric motor is provided for each of the door body 11 and the door body 12 instead of the rotary electric motor. The linear electric motors in the door closing apparatus of the comparative example necessarily include coils or permanent magnets aligned to cover at least a length L1 in the opening/closing direction irrespective of a size of their moving parts. As shown in FIG. 9B, the rotary electric motors (electric motor 31 and electric motor 32) in the door closing apparatus 100 according to this embodiment include only coils or permanent magnets aligned by a length corresponding to twice the circumference of the rotor 31*b* (a circumferential length of two rotors) because the travel distance L1 can be covered by rotating the rotary electric motors plural times. For this reason, quantity of the magnet or coil can be reduced in the door closing apparatus 100 according to the one embodiment of the present invention as compared with the door closing apparatus of the comparative example, and as a result the door closing apparatus 100 according to the one embodiment can have a smaller size and a smaller weight than the door closing apparatus of the comparative example. For example, in a case in which permanent magnets used in the linear motor in the comparative example and permanent magnets used in the rotary electric motor according to this embodiment have an equal density, an equal height and an equal thickness, and the rotor in rotary electric motor in this embodiment has a diameter equal to approximately 0.2 times a travel distance of one of the door body 11 and the door body 12, the permanent magnets in the rotary electric motor in this embodiment have a weight equal to approximately 17% of the weight of the permanent magnets of the linear motor in the comparative example.

Advantages of the Embodiment

In this embodiment, the following advantages are obtained.

As discussed above, a production method of a door closing apparatus 100 according to this embodiment includes an electric motor 31 (first rotary electric motor) that is configured to rotate a pinion 23 (first pinion) to open and close a door body 11 (first door body) coupled to a rack 21 (first rack); and an electric motor 32 (second rotary electric motor) that is provided separately from the electric motor 31 (first rotary electric motor), and configured to rotate a pinion 24 (second pinion) to open and close a door body 12 coupled to a rack 22 (second rack). According to this configuration, because the number of permanent magnets used in a rotary electric motor is smaller than a linear motor, as compared with a case in which linear motors are used to open and close the door body 11 and the door body 12, the entire weight of the apparatus can be reduced by using the electric motor 31 and the electric motor 32. Therefore, in a case in which two door bodies 11 and 12 are independently opened/closed, it is possible to prevent their weight increase.

In this embodiment, as discussed above, the rack 21 (first rack) is arranged to partially overlap the rack 22 (second rack) in the opening/closing direction (X direction). According to this configuration, the first rack and the second rack can have a length reduced by an amount corresponding to the overlap between the rack 21 and the rack 22 in the opening/closing direction.

In this embodiment, as discussed above, the rack 21 (first rack) is arranged on upper sides of the door body 11 (first door body) and the door body 12 (second door body), and extends in the opening/closing direction (X direction) of the door body 11 or the door body 12 from the door body 11 toward the door body 12; and the rack 22 (second door body) is arranged on the upper sides of the door body 11 and the door body 12, and extends in the opening/closing direction from the door body 12 toward the door body 11. According to this configuration, because the rack 21 and the rack 22 are arranged on the upper sides of the door body 11 and the door body 12, space of a transom part, which corresponds to the upper sides of the door body 11 and the door body 12, can be effectively used. Also, because the rack 21 extends in the opening/closing direction from the door body 11 toward the door body 12, and the rack 22 extends in the opening/closing direction from the door body 12 toward the door body 11, the rack 21 and the rack 22 can have a length effectively reduced in the opening/closing direction in the space of a transom part, which corresponds to the upper sides of the door body 11 and the door body 12.

In this embodiment, as discussed above, the electric motor 31 (first rotary electric motor) is arranged on the closing direction side (X2-direction side) with respect of a center in the opening/closing direction (X direction) of the door body 11 (first door body) on the upper side of the door body 11, and the electric motor 32 (second rotary electric motor) is arranged on the closing direction side (X1-direction side) with respect of a center in the opening/closing direction (X direction) of the door body 12 (second door body) on the upper side of the door body 12. According to this configuration, the overlap between the rack 21 (first rack) and the rack 22 (second door body) can be increased as compared with a case in which the electric motor 31 is arranged on an opening direction side with respect to the center of the door body 11 in the opening/closing direction, and the electric motor 32 is arranged above the door body 12 on an opening direction side with respect to the center of the door body 12 in the opening/closing direction, the length of the rack 21 (first rack) and the rack 22 (second rack) in the opening/closing direction can be reduced. Consequently, the length in the opening/closing direction can be further reduced.

In this embodiment, as discussed above, the rack 21 (first rack) and the rack 22 (second rack) face each other and extend in the opening/closing direction (X direction); and the pinion 23 (first pinion) and the pinion 24 (second pinion) are interposed between the rack 21 and the rack 22, and offset from each other in a forward/backward direction orthogonal to the opening/closing direction and an upward/downward direction (Z direction). According to this configuration, because the pinion 23 and the second pinion 24 are offset from each other in the upward/downward or the forward/backward direction, the pinion 23, which rotatably meshes with the rack 21, can be prevented from interfering with the rack 23, and the pinion 24, which rotatably meshes with the rack 22, can be prevented from interfering with the rack 21. Accordingly, in a case in which the pinion 23 and the pinion 24 are interposed between the rack 21 and the rack 22, and aligned in the opening/closing direction, two different door bodies can be opened and closed independently from each other. As a result, an increase of the length of the rack 21 and the rack 22 in a direction in which the rack 21 and the rack 22 face each other can be prevented by aligning the pinion 23 and the pinion 24 in the opening/closing direction between the rack 21 and the rack 22.

In this embodiment, as discussed above, the door closing apparatus 100 includes a controller 41 (first controller) that is configured to control a function of driving the electric motor 31 (first rotary electric motor); and a controller 42 (second controller) that is provided separately from the controller 41 and configured to control a function of driving the electric motor (second rotary electric motor). According to this configuration, in case in which a failure occurs in one of the separated controllers 41 and 42, another controller which the failure does not occur can control its corresponding rotary electric motor so that the door body 11 (first door body) or the door body 12 (second door body) corresponding to another side can be opened and closed. Accordingly, dissimilar to a case in which a common controller controls functions of driving the electric motor 31 and of the electric motor 32, in case in which a failure occurs in one of the controllers, it is possible to prevent disabling of functions of opening/closing both the door bodies 11 and 12.

In this embodiment, as discussed above, the door closing apparatus 100 includes a door body detector 51 (first door body detector) that is configured to detect a position of the rack 21 (first rack) so as to detect an opened/closed state of the door body 11 (first door body) and to provide a signal indicating the opened/closed state of the door body 11 to the controller 41 (first controller); and a door body detector 52 (second door body detector) that is provided separately from the body detector 51 and configured to detect a position of the rack 22 (second rack) so as to detect an opened/closed state of the door body 12 (second door body) and to provide a signal indicating the opened/closed state of the door body 12 to the controller 42 (first controller). According to this configuration, it can be determined whether the function of opening/closing the door body 11 is properly controlled by the controller 41 based on the signal from the door body detector 51, and it can be determined whether the function of opening/closing the door body 12 is properly controlled by the controller 42 based on the signal from the door body detector 52. Accordingly, because it can be separately determined whether the controller 41 and the controller 42 properly control their functions, in case in which a failure occurs in any one of the controller 41 and the controller 42, the function of opening/closing the door body 11 or the door body 12 can be controlled by another controller in which the failure does not occur.

In this embodiment, as discussed above, the door closing apparatus 100 includes a lock 61 (first lock) that is configured to limit movement of the rack 21 (first rack) so as to limit movement of the door body 11 (first door body) in its opening direction (X1 direction); and a lock 62 (second lock) that is provided separately from the lock 61 and configured to limit movement of the rack 22 (second rack) so as to limit movement of the door body 12 (second door body) in its opening direction (X2 direction). According to this configuration, movement of the door body 11 (first door body) and movement of the door body 12 (second door body) can be independently limited by independently limiting movement of the rack 21 (first rack) and movement of the rack 22 (second rack). Accordingly, in case in which a failure occurs in any one of the electric motor 31 (first rotary electric motor), which moves the door body 11, and the electric motor 32 (second rotary electric motor), which moves the door body 12, while movement of one of the door bodies 11 and 12 corresponding the one of the rotary electric motors 31 and 32 in which the failure occurs can be limited by the lock 61 or the lock 62, movement of another door body corresponding another rotary electric motors in which the failure does not occur can be allowed so that another door body corresponding another rotary electric motors in which the failure does not occur can be opened/closed.

In this embodiment, as discussed above, the door closing apparatus 100 includes a lock detector 61*c* (first lock detector) that is configured to detect the limitation of movement of the rack 21 (first rack) limited by the lock 61 (first lock); and a lock detector 62*c* (second lock detector) that is configured to detect the limitation of movement of the rack 22 (second rack) limited by the lock 62 (second lock). According to this configuration, it can be separately determined whether the limitation of movement is properly limited by the lock 61 and whether the limitation of movement is properly limited by the lock 62. Accordingly, it is possible to prevent from maintaining an improper state in which movement of the door body 11 (first door body) and movement of the door body 11 (second door body) are not properly limited.

In this embodiment, as discussed above, the rack 21 (first rack) is coupled to the door body 11 (first door body) installed on a rail car, and extends in the closing direction (X2 direction) of the door body 11; and the rack 22 (second rack) is coupled to the door body 12 (first door body) installed on the rail car, and extends in the closing direction (X1 direction) of the door body 12. Because a rail car 101 has limits of load weight and capacity area, according to this configuration, in a case in which the door body 11 and the door body 12, which are installed on the rail car 101, are independently opened and closed, increase of the weight can be prevent and the length in the opening/closing direction (X direction) can be effectively reduced.

Modified Example

Note that the embodiment disclosed in this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the pinion 23 (first pinion) and the pinion 24 (second pinion) are offset from each other in the upward/downward (Z direction) has been shown in the aforementioned embodiment, the present invention is not limited to this. In the present invention, the first and second pinions may be offset from each other in the forward/backward direction.

First Modified Example

Figure 10A:
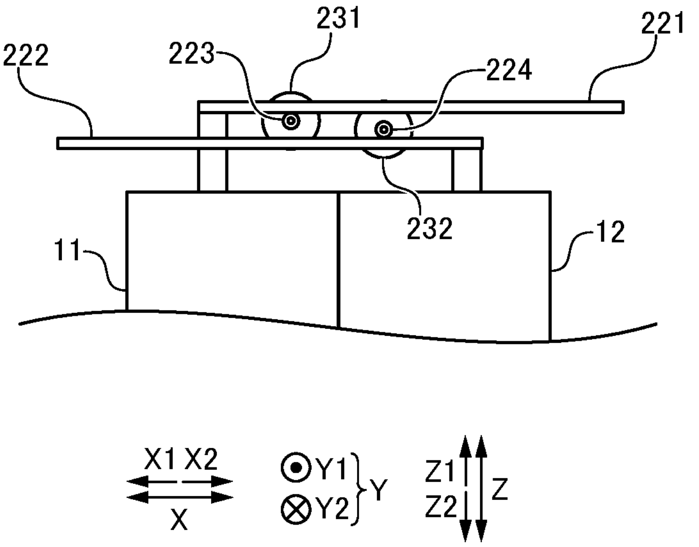
FIG. 10A is a front diagram showing a configuration of a door closing apparatus according to a first modified example of the one embodiment.
Figure 10B:
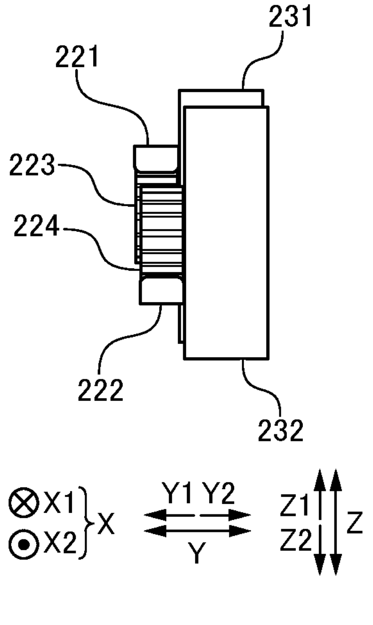
FIG. 10B is a side diagram showing the configuration of the door closing apparatus according to the first modified example of the one embodiment.

In a door closing apparatus according to a first modified example of the embodiment shown in FIGS. 10A and 10B, a pinion 223 (first pinion) and a pinion 224 (second pinion) may be offset from each other in the upward/downward direction (Z direction) to partially overlap each other as viewed in the opening/closing direction (X direction). In this configuration, the pinion 223 is configured to be rotated by a driving function of an electric motor 231 (first rotary electric motor) while a Z1-direction side of the pinion 223 being meshing with a rack 221 (first rack) coupled to the door body 11. Also, the pinion 224 is configured to be rotated by a driving function of an electric motor 232 (second rotary electric motor) while a Z2-direction side of the pinion 224 being meshing with a rack 222 (second rack) coupled to the door body 12. Accordingly, the door closing apparatus can have a further reduced size in the upward/downward direction.

Second Modified Example

Figure 11A:
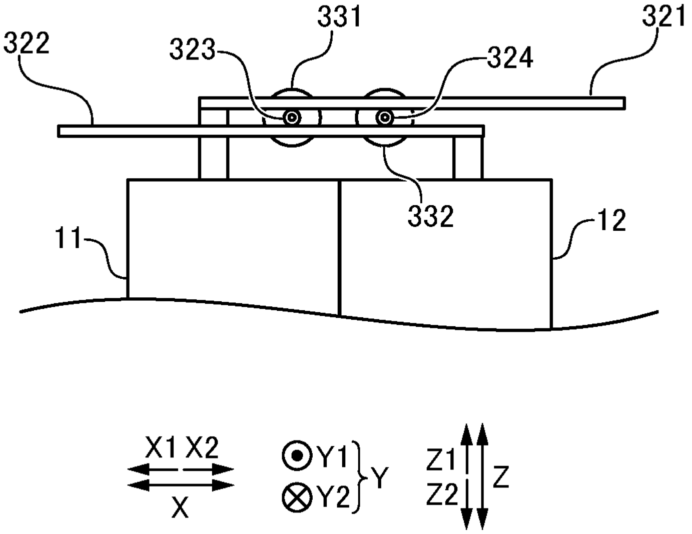
FIG. 11A is a front diagram showing a configuration of a door closing apparatus according to a second modified example of the one embodiment.
Figure 11B:
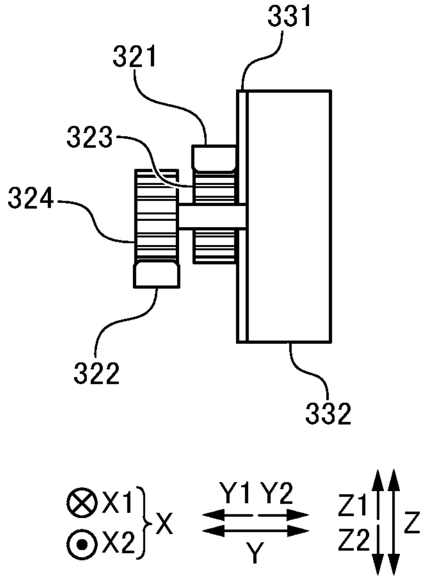
FIG. 11B is a side diagram showing the configuration of the door closing apparatus according to the second modified example of the one embodiment.

In a door closing apparatus according to a second modified example of the embodiment shown in FIGS. 11A and 11B, a pinion 323 (first pinion) and a pinion 324 (second pinion) may be aligned in the opening/closing direction (X direction) as viewed in the forward/backward direction (Y direction). In other words, the pinion 323 and the pinion 324 are arranged at the same height position in the upward/downward direction (Z direction). In this configuration, the pinion 323 is configured to be rotated by a driving function of an electric motor 331 (first rotary electric motor) while a Z1-direction side of the pinion 323 being meshing with a rack 321 (first rack) coupled to the door body 11. Also, the pinion 324 is configured to be rotated by a driving function of an electric motor 332 (second rotary electric motor) while a Z2-direction side of the pinion 324 being meshing with a rack 322 (second rack) coupled to the door body 12. The electric motor 331 and the electric motor 332 are aligned in the opening/closing direction (X direction) as viewed in the forward/backward direction (Y direction), and are arranged at roughly the same position in the forward/backward direction. Contrary to this, the pinion 323 and the pinion 324 are arranged at different positions in the forward/backward direction (Y direction). Specifically, the pinion 324 is coupled to the electric motor 332, and protrudes from the electric motor 332 toward the Y1 direction side as compared with the pinion 323. The rack 321 and the rack 322 are arranged at different positions from each other in the forward/backward direction corresponding to the positions of the pinion 323 and the pinion 324. According to this arrangement in which the rack 321 and the rack 322 are offset from each other in the forward/backward direction, the door body apparatus can have a size corresponding to one electric motor in the upward/downward direction even in a case in which two electric motors are used. Accordingly, the door body apparatus can have a further reduced size in the upward/downward direction. The rack 321 may be arranged either on the Z1-direction side or on the Z2-direction side with respect to the pinion 323, and the rack 322 may be arranged either on the Z1-direction side or on the Z2-direction side with respect to the pinion 324. In a case in which both the rack 321 and the rack 322 are arranged on the Z2-direction side, space on the Z1-direction side can be reduced by a size of one rack, and as a result, the door closing apparatus can have a further reduced size.

Third Modified Example

Figure 12A:
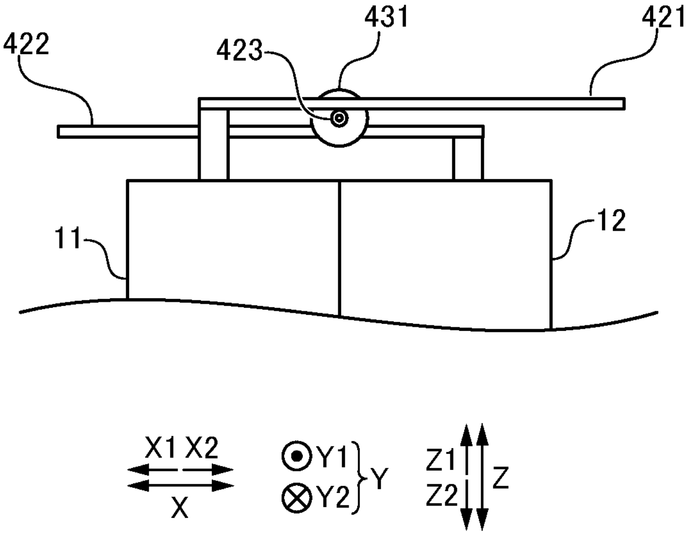
FIG. 12A is a front diagram showing a configuration of a door closing apparatus according to a third modified example of the one embodiment.
Figure 12B:
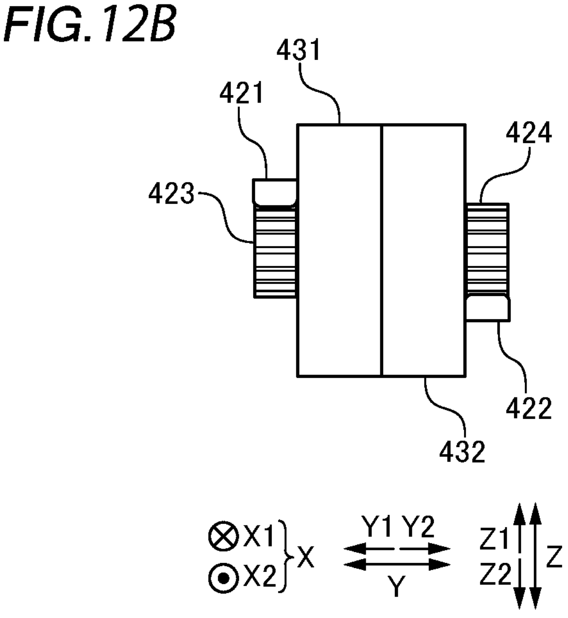
FIG. 12B is a side diagram showing the configuration of the door closing apparatus according to the third modified example of the one embodiment.

In a door closing apparatus according to a third modified example of the embodiment shown in FIGS. 12A and 12B, an electric motor 431 (first rotary electric motor) configured to drive a pinion 423 (first pinion) and an electric motor 432 (second rotary electric motor) configured to drive a pinion 424 (second pinion) may be arranged back to back. In other words, the electric motor 431 and the electric motor 432 face outward in the forward/backward direction (Y direction), that is, in opposite directions, so that they overlap each other as viewed in the forward/backward direction (Y direction). Accordingly, the pinion 423 and the pinion 424 overlap each other as viewed in the forward/backward direction (Y direction), similar to the electric motor 431 and the electric motor 432. In this configuration, the pinion 423 is configured to be rotated by a driving function of an electric motor 431 while a Z1-direction side of the pinion 423 being meshing with a rack 421 (first rack) coupled to the door body 11. Also, the pinion 424 is configured to be rotated by a driving function of an electric motor 432 while a Z2-direction side of the pinion 424 being meshing with a rack 422 (second rack) coupled to the door body 12. Accordingly, the door body apparatus can have a further reduced size in the upward/downward direction, similar to the door closing apparatus according to the second modified example. The rack 421 may be arranged either on the Z1-direction side or on the Z2-direction side with respect to the pinion 423, and the rack 422 may be arranged either on the Z1-direction side or on the Z2-direction side with respect to the pinion 424. In a case in which both the rack 421 and the rack 422 are arranged on the Z2-direction side, space on the Z1-direction side can be reduced by a size of one rack, and as a result, the door closing apparatus can have a further reduced size.

Fourth Modified Example

Figure 13A:
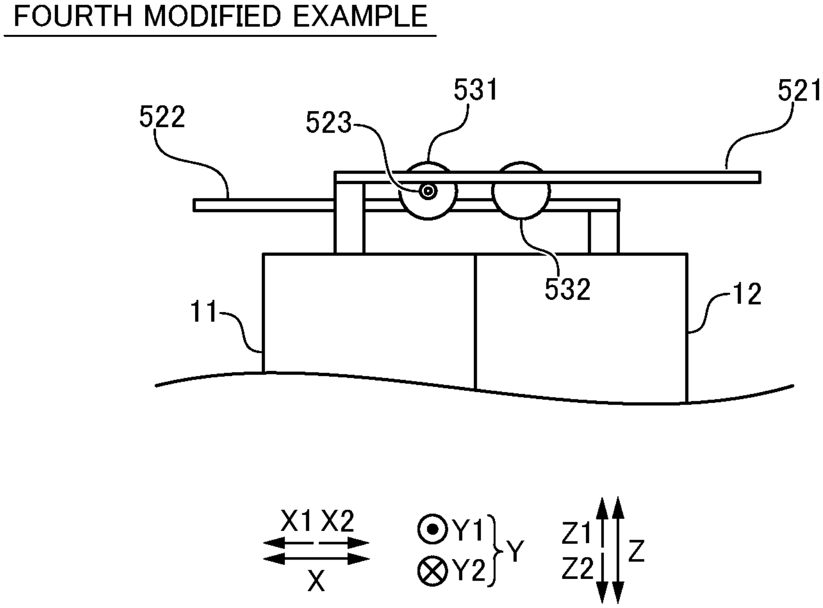
FIG. 13A is a front diagram showing a configuration of a door closing apparatus according to a fourth modified example of the one embodiment.
Figure 13B:
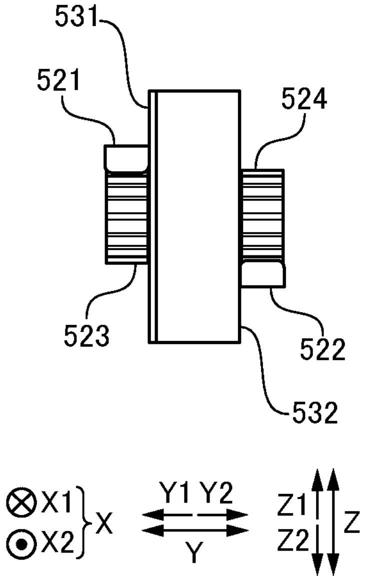
FIG. 13B is a side diagram showing the configuration of the door closing apparatus according to the fourth modified example of the one embodiment.

In a door closing apparatus according to a fourth modified example of the present embodiment shown in FIGS. 13A and 13B, an electric motor 531 (first rotary electric motor) configured to drive a pinion 523 (first pinion) and an electric motor 532 (second rotary electric motor) configured to drive a pinion 524 (second pinion) may be arranged adjacent to each other in the opening/closing direction (X direction) with facing outward in the forward/backward direction (Y direction). That is, the electric motor 531 and the electric motor 532 overlap each other as viewed in the opening/closing direction (X direction). The pinion 523 is arranged on the Y1-direction side, and the pinion 524 is arranged on the Y2-direction side. In this configuration, the pinion 523 is configured to be rotated by a driving function of an electric motor 531 while a Z1-direction side of the pinion 523 being meshing with a rack 521 (first rack) coupled to the door body 11. Also, the pinion 524 is configured to be rotated by a driving function of an electric motor 532 while a Z2-direction side of the pinion 524 being meshing with a rack 522 (second rack) coupled to the door body 12. Accordingly, the door body apparatus can have a reduced size in the forward/backward direction smaller than the door closing apparatus according to the third modified example. Similarly, the rack 521 may be arranged either on the Z1-direction side or on the Z2-direction side with respect to the pinion 523, and the rack 522 may be arranged either on the Z1-direction side or on the Z2-direction side with respect to the pinion 524. In a case in which both the rack 521 and the rack 522 are arranged on the Z2-direction side, space on the Z1-direction side can be reduced by a size of one rack, and as a result, the door closing apparatus can have a further reduced size.

Fifth Modified Example

Figure 14A:
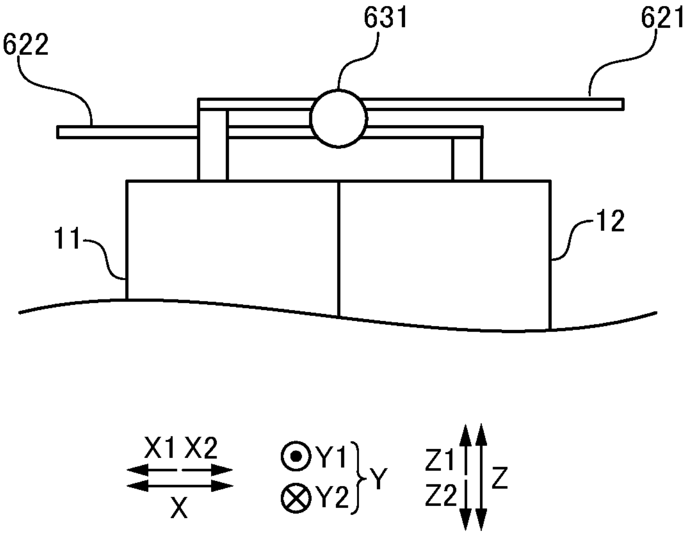
FIG. 14A is a front diagram showing a configuration of a door closing apparatus according to a fifth modified example of the one embodiment.
Figure 14B:
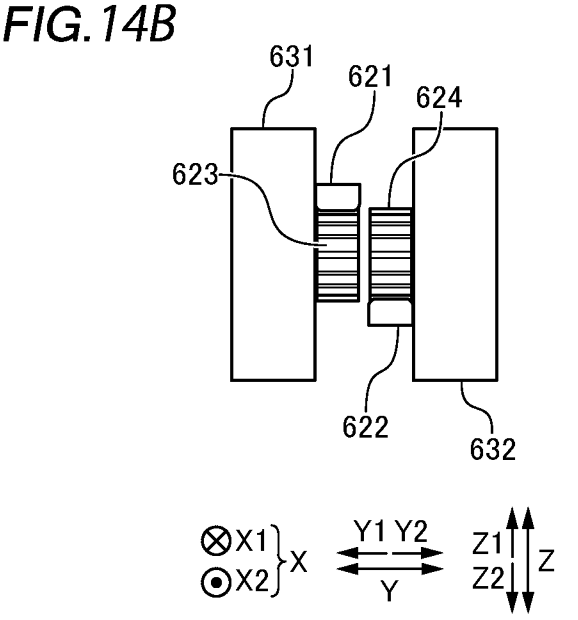
FIG. 14B is a side diagram showing the configuration of the door closing apparatus according to the fifth modified example of the one embodiment.

In a door closing apparatus according to a fifth modified example of the present embodiment shown in FIGS. 14A and 14B, an electric motor 631 (first rotary electric motor) configured to drive a pinion 623 (first pinion) and an electric motor 632 (second rotary electric motor) configured to drive a pinion 624 (second pinion) may be arranged face to face. In other words, the electric motor 631 and the electric motor 632 may overlap each other as viewed in the forward/backward direction (Y-direction) with facing the pinion 623 and the pinion 624 inward in the forward/backward direction (Y direction). Accordingly, the pinion 623 and the pinion 624 overlap each other as viewed in the forward/backward direction (Y-direction) with facing each other, similar to the electric motor 631 and the electric motor 632. In this configuration, the pinion 623 is configured to be rotated by a driving function of an electric motor 631 while a Z1-direction side of the pinion 623 being meshing with a rack 621 (first rack) coupled to the door body 11. Also, the pinion 624 is configured to be rotated by a driving function of an electric motor 632 while a Z2-direction side of the pinion 624 being meshing with a rack 622 (second rack) coupled to the door body 12. Accordingly, the door body apparatus can have a further reduced size in the upward/downward direction, similar to the door closing apparatus according to the third modified example. Similarly, the rack 621 may be arranged either on the Z1-direction side or on the Z2-direction side with respect to the pinion 623, and the rack 622 may be arranged either on the Z1-direction side or on the Z2-direction side with respect to the pinion 624, similar to the door closing apparatus according to the third modified example. In a case in which both the rack 621 and the rack 622 are arranged on the Z2-direction side, space on the Z1-direction side can be reduced by a size of one rack, and as a result, the door closing apparatus can have a further reduced size.

Sixth Modified Example

Figure 15A:
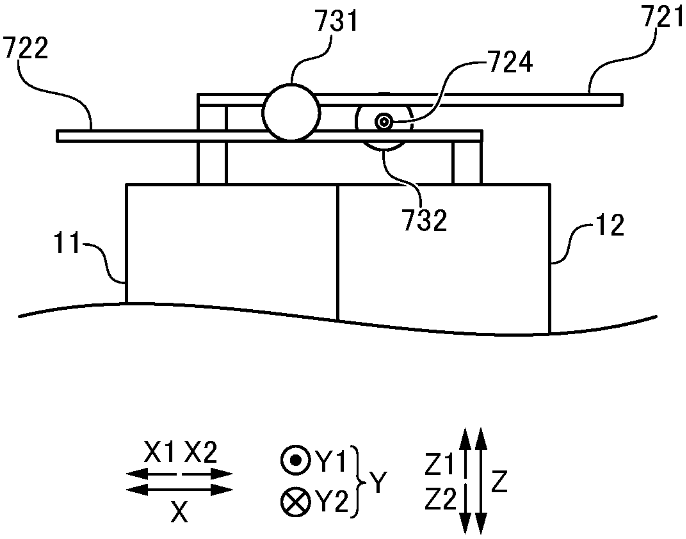
FIG. 15A is a front diagram showing a configuration of a door closing apparatus according to a sixth modified example of the one embodiment.
Figure 15B:
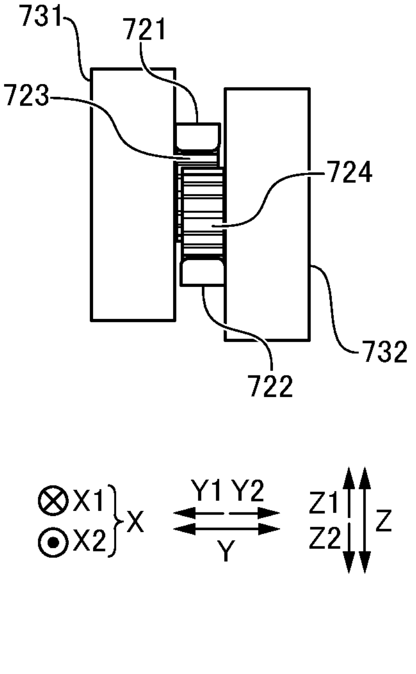
FIG. 15B is a side diagram showing the configuration of the door closing apparatus according to the sixth modified example of the one embodiment.

In a door closing apparatus according to a sixth modified example of the present embodiment shown FIGS. 15A and 15B, an electric motor 731 (first rotary electric motor) configured to drive a pinion 723 (first pinion) and an electric motor 732 (second rotary electric motor) configured to drive a pinion 724 (second pinion) may be arranged adjacent to each other in the opening/closing direction (X direction) with facing inward in the forward/backward direction (Y direction). That is, the pinion 723 and the pinion 724 partially overlap each other as viewed in the opening/closing direction (X direction). The pinion 723 is arranged in a Y2-direction side of the electric motor 731, and the pinion 724 is arranged on the Y1-direction side of the electric motor 732. Also, the pinion 723 and the pinion 724 overlap each other with being slightly offset from each other in the upward/downward direction (Z direction). The pinion 723 is configured to be rotated by a driving function of an electric motor 731 while a Z1-direction side of the pinion 723 being meshing with a rack 721 (first rack) coupled to the door body 11. Also, the pinion 724 is configured to be rotated by a driving function of an electric motor 732 while a Z2-direction side of the pinion 724 being meshing with a rack 722 (second rack) coupled to the door body 12. Accordingly, the door closing apparatus can have a reduced size in the forward/backward direction (Y direction) as compared with the door closing apparatus according to the fifth modified example.

While the example in which a controller 41 (first controller) configured to control a function of driving the electric motor 31 (first rotary electric motor) and a controller 42 (second controller) configured to control a function of driving the electric motor 32 (second rotary electric motor) are separately provided, has been shown in the aforementioned embodiment, the present invention is not limited to this. In the present invention, a common controller may be provided to control a function of driving the first rotary electric motor and a function of driving the second rotary electric motor.

While the example in which the door body 11 (first door body) and the door body 12 (second door body) installed on a rail car 101 are opened and closed, has been shown in the aforementioned embodiment, the present invention is not limited to this. In the present invention, the first door body and the second door body installed on a vehicle other than a rail car or a ship may be opened and closed. Also, the first door body and the second door body installed on a stationary place such as a building may be opened and closed.

While the example in which the door body detector 51 (first door body detector) is configured to detect a position of the rack 21 (first rack) in the opened and closed states by detecting the connector 25 to detect the opened and closed states of the door body 11, and the door body detector 52 (second door body detector) is configured to detect a position of the rack 22 (second rack) in the opened and closed states by detecting the connector 26 to detect the opened and closed states of the door body 12, has been shown in the aforementioned embodiment, the present invention is not limited to this. In the present invention, the opened and closed states of the first door body may be detected not by detecting the connector that connects the first rack to the first door body but by directly detecting a position of the first rack. Alternatively, the opened and closed states of the second door body may be detected not by detecting the connector that connects the second rack to the second door body but by directly detecting a position of the second rack. Alternatively, the first door body detector and the second door body detector may directly detect positions of the first door body and the second door body, respectively.

While the example in which the rack 21 (first rack) and the rack 22 (second rack) overlap each other as viewed in the upward/downward direction, has been shown in the aforementioned embodiment, the present invention is not limited to this. In the present invention, the first rack and the second rack may overlap each other as viewed in the forward/backward direction.

What is claimed is:

1. A door closing apparatus comprising:

first and second door bodies that are configured to slide in opening/closing directions in which one of the first and second door bodies moves away from or toward another of the first and second door bodies;

a first rack that is mounted on the first door body and extends in the opening/closing directions;

a second rack that is mounted on the second door body and extends in the opening/closing directions;

a first pinion that rotatably meshes with the first rack;

a second pinion that rotatably meshes with the second rack;

a first rotary electric motor that is configured to rotate the first pinion to open and close the first door body; and a second rotary electric motor that is provided separately from the first rotary electric motor and configured to rotate the second pinion to open and close the second door body, wherein when the first and the second door bodies are in a closed state, a maximum amount that an end of the first rack protrudes in the opening direction of the second door body from an outer edge of the second door body in the opening direction of the second door body is equal to or less than half a width of the second door body in the opening/closing directions, and a maximum amount that an end of the second rack protrudes in the opening direction of the first door body from an outer edge of the first door body in the opening direction of the first door body is equal to or less than half a width of the first door body in the opening/closing directions, and wherein the first rack and the second rack face each other and extend in the opening/closing directions;

the first rotary electric motor is arranged above the first door body in a position closer, in the opening/closing directions, to an outer edge of the first door body in the closing direction of the first door body than a center of the first door body when the first and second door bodies are in the closed state; and the second rotary electric motor is arranged above the second door body in a position closer, in the opening/closing directions, to an outer edge of the second door body in a closing direction of the second door body than a center of the second door body when the first and second door bodies are in the closed state; and the first pinion and the second pinion are interposed between the first rack and the second rack and offset from each other in upward/downward directions or forward/backward directions orthogonal to the opening/closing directions and the upward/downward directions.

2. The door closing apparatus according to claim 1, wherein the first rack is arranged to partially overlap the second rack along the opening/closing directions as viewed in the upward/downward directions which are orthogonal to the opening/closing directions.

3. The door closing apparatus according to claim 1, wherein the first rack is arranged on an upper side of both the first door body and the second door body, and extends in the closing direction of the first door body from the first door body toward the second door body; and the second rack is arranged on the upper side of both the first door body and the second door body, and extends in the closing direction of the second door body from the second door body toward the first door body.

4. The door closing apparatus according to claim 1, further comprising:

a first controller that is configured to control a function of driving the first rotary electric motor; and a second controller that is provided separately from the first controller and configured to control a function of driving the second rotary electric motor.

5. The door closing apparatus according to claim 4, further comprising:

a first door body detector that is configured to detect a position of the first rack so as to detect a position of the first door body and to provide a signal indicating the position of the first door body to the first controller; and a second door body detector that is provided separately from the first door body detector and configured to detect a position of the second rack so as to detect position of the second door body and to provide a signal indicating the position of the second door body to the second controller.

6. The door closing apparatus according to claim 1, further comprising:

a first lock that is configured to limit movement of the first rack so as to limit movement of the first door body in the opening direction of the first door body; and a second lock that is provided separately from the first lock and configured to limit movement of the second rack so as to limit movement of the second door body in the opening direction of the second door body.

7. The door closing apparatus according to claim 6, further comprising:

a first lock detector that is configured to detect when the first lock limits the movement of the first rack; and a second lock detector that is configured to detect when the second lock limits the movement of the second rack.

8. The door closing apparatus according to claim 1, wherein the first rack is coupled to the first door body installed on a rail car; and the second rack is coupled to the second door body installed on the rail car.

9. The door closing apparatus according to claim 5, wherein the first rack is distanced from the second rack in the upward/downward directions.

10. The door closing apparatus according to claim 5, wherein both the first pinion and the second pinion are arranged between the first rack and the second rack.

11. The door closing apparatus according to claim 1, wherein the first pinion is mounted on a rotational shaft of the first rotary electric motor and the second pinion is mounted on a rotational shaft of the second rotary electric motor.

12. A door closing apparatus comprising:

first and second door bodies that are configured to slide in opening/closing directions in which one of the first and second door bodies moves away from or toward another of the first and second door bodies;

a first rack that is mounted on the first door body and extends in the opening/closing directions;

a second rack that is mounted on the second door body and extends in the opening/closing directions;

a first pinion that rotatably meshes with the first rack;

a second pinion that rotatably meshes with the second rack;

a first rotary electric motor that is configured to rotate the first pinion to open and close the first door body; and a second rotary electric motor that is provided separately from the first rotary electric motor and configured to rotate the second pinion to open and close the second door body, wherein the first rack and the second rack face each other and extend in the opening/closing directions;

the first rotary electric motor is arranged above the first door body in a position closer, in the opening/closing directions, to an outer edge of the first door body in the closing direction of the first door body than a center of the first door body when the first and second door bodies are in a closed state; and the second rotary electric motor is arranged above the second door body in a position closer, in the opening/closing directions, to an outer edge of the second door body in a closing direction of the second door body than a center of the second door body when the first and second door bodies are in the closed state;

the first pinion mounted on a rotational shaft of the first rotary electric motor and the second pinion mounted on a rotational shaft of the second rotary electric motor are interposed between the first rack and the second rack and offset from each other in upward/downward directions or forward/backward directions orthogonal to the opening/closing directions and the upward/downward directions;

the first rack is arranged to partially overlap the second rack along the opening/closing directions as viewed in the upward/downward directions which are orthogonal to the opening/closing directions, a whole of the first rotary electric motor is arranged, as viewed from the forward/backward directions, between a center of an aperture that is closed by the first and second door bodies and a first connection portion that connects the first rack and the first door body, and a whole of the second rotary electric motor is arranged, as viewed from the forward/backward directions, between the center of the aperture and a second connection portion that connects the second rack and the second door body.

* * * * *